United States Patent [19]

Arastoopour et al.

[11] Patent Number: 5,904,885
[45] Date of Patent: May 18, 1999

[54] PROCESS FOR RECYCLING OF RUBBER MATERIALS

[75] Inventors: Hamid Arastoopour, Downers Grove; Daniel A. Schocke, Streamwood; Barry Bernstein; Ecevit Bilgili, both of Chicago, all of Ill.

[73] Assignee: Illinois Institute of Technology, Chicago, Ill.

[21] Appl. No.: 08/985,426

[22] Filed: Dec. 4, 1997

[51] Int. Cl.[6] .................................................. B29C 43/02
[52] U.S. Cl. ........................ 264/115; 264/126; 264/140; 264/911; 264/912; 264/331.13
[58] Field of Search ................................... 264/115, 126, 264/140, 911, 912, 331.13

[56] References Cited

U.S. PATENT DOCUMENTS

| | | | |
|---|---|---|---|
| 4,469,817 | 9/1984 | Hayashi et al. | 521/45 |
| 4,499,218 | 2/1985 | Lyakhevich et al. | 524/79 |
| 4,506,034 | 3/1985 | Munih | 521/41 |
| 4,607,796 | 8/1986 | Enikolopov et al. | 241/3 |
| 4,665,101 | 5/1987 | Ficker | 521/41 |
| 4,851,500 | 7/1989 | Lalwani et al. | 528/487 |
| 5,160,670 | 11/1992 | Hamada et al. | 264/6 |
| 5,258,413 | 11/1993 | Isayev | 521/45.5 |
| 5,316,708 | 5/1994 | Drews | 264/40.5 |
| 5,356,939 | 10/1994 | Burrowes et al. | 521/41.5 |
| 5,397,065 | 3/1995 | Shutov et al. | 241/16 |
| 5,411,216 | 5/1995 | O'Keefe | 241/24 |
| 5,439,735 | 8/1995 | Jamison | 428/255 |
| 5,527,409 | 6/1996 | Lanphier | 156/71 |
| 5,575,966 | 11/1996 | Baatz | 264/177.1 |
| 5,578,700 | 11/1996 | Hunt et al. | 528/501 |
| 5,800,754 | 9/1998 | Woods | 264/115 |

*Primary Examiner*—Mary Lynn Theisen
*Attorney, Agent, or Firm*—Pauley Petersen Kinne & Fejer

[57] ABSTRACT

A process for recycling rubber, elastomers, and thermoset materials in which the material to be recycled is pulverized in a manner which maintains the chemical composition of the material, producing a powder. The powder is introduced into a mold which is heated to a temperature of at least about 200° C. and a compression force of at least about 10 tons is applied to the powder for a period of at least one hour, resulting in formation of a single piece of the rubber, elastomeric, or thermoset material, with no change in chemical structure.

8 Claims, 14 Drawing Sheets

PROCESS FOR RECYCLING OF RUBBER MATERIALS

BACKGROUND OF THE INVENTION

1. Field of the Invention

This invention relates to a process for recycling of polymeric materials, in particular rubber and elastomers, in which the polymeric material is pulverized in a manner which does not change its chemical composition so as to produce a polymeric powder, which polymeric powder is then reformed into a single piece of polymeric material. The process of this invention reconstitutes the polymeric material, such as rubber, without changing its chemical structure whereby chemical bonds that were broken during the pulverization process are linked.

2. Description of Prior Art

Present devulcanization and thermomechanical processes for reconstitution of rubber change the chemical structure of the rubber and, in turn, reproduce rubbers having poorer mechanical properties than the original rubber. Processes for the reconstitution of rubber are taught, for example, by U.S. Pat. No. 4,665,101 which teaches a method for the continuous, dry, non-pressurized regeneration of salvaged rubber in which the rubber is heated to a reclamation temperature in a two-stage process, whereby the overall heat required is introduced by microwave heating and conventional heating; U.S. Pat. No. 4,851,500 which teaches a process and apparatus for making a rubber-like product from rubber scrap in which the rubber scrap is mixed with added sulphur and a pressure of about 1,000 to 3,000 pounds per square inch applied thereto for one to ten minutes at a temperature of about 250° to about 450° F.; U.S. Pat. No. 5,578,700 which teaches a method and apparatus for recovering devulcanized rubber or purified carbon and volatiles from a crumb rubber feed material in which the material is introduced into a first chamber under pressure, the pressure is reduced and the rubber particles are conveyed therethrough with a screw conveyor, microwave energy input is provided to the rubber particles so as not to effect chemical destruction of volatile components, the volatiles are recovered from the rubber particles after it has been heated, and rubber crumb is withdrawn from the first chamber, which steps are then repeated in a second chamber; U.S. Pat. No. 5,527,409 which teaches a method of making recycled tire roof sheeting in which used tires are shredded into small particle sizes and subsequently compacted into large log-like articles; U.S. Pat. No. 4,506,034 which teaches a method for continuously processing coarse-grain waste rubber into a secondary rubber raw material in which the coarse-grain waste rubber is exposed to a thermoshock without access to oxygen at a temperature of about 200° C. to 900° C. for a period of 5 to 200 seconds; and U.S. Pat. No. 4,469,817 which teaches the reclamation of vulcanized rubber by heating powdered vulcanized rubber to a temperature for desulpherization of the rubber and, on completion of the desulpherization, cooling the desulpherized rubber to a temperature at which substantially no oxidation thereof can occur.

Numerous methods for breaking down rubber compounds for recycling and other applications are well known to those skilled in the art. U.S. Pat. No. 4,607,796 teaches a method for producing powders from rubber and vulcanization products in which the source material is pulverized in an extruder in which it is first compressed by a force of 0.2 to 0.7 MPa and then subjected simultaneously to a pressure ranging from 0.2 to 50 MPa at a sheer force ranging from 0.3 to 5N/mm$^2$ while heating the material to a temperature ranging from 80° C. to 250° C. and then cooling the material to a temperature ranging from 15° C. to 60° C. U.S. Pat. No. 5,258,413 teaches a continuous ultrasonic method for breaking the carbon-sulphur, sulphur-sulphur, and carbon-carbon bonds in a vulcanized elastomer. U.S. Pat. No. 5,411,216 teaches a shredding machine and process for recycling used vehicular tires comprising a primary shredder and process, a secondary shredder and process, a granulator and a first process, a material separating means and process, and a granulator and a second process. Finally, U.S. Pat. No. 4,499,218 teaches a vulcanizable rubber compound comprising an oxidized oligomer derived from thermally decomposed rubber materials, and containing a diene rubber.

SUMMARY OF THE INVENTION

Natural and synthetic polymer wastes, including rubber, are increasing and environmental concerns about their disposition render recycling necessary. However, many reclamation processes to date have been limited to certain types of waste, have been uneconomical, particularly with respect to energy consumption, and have not provided reclaimed material in a form conducive to reuse manufacturing.

It is one object of this invention to provide a low cost, low energy consumption process for recycling of polymeric materials such as rubber, elastomers, and thermosets.

It is yet another object of this invention to provide a process for reconstitution of rubber without changing its chemical structure, thereby enabling reproduction of the rubber having mechanical properties substantially equivalent to the mechanical properties of the original rubber.

These and other objects of this invention are achieved by a process for recycling rubber comprising the steps of pulverizing the rubber in a manner which maintains the chemical composition of the rubber resulting in formation of a powder, introducing the powder into a mold, heating the mold to a temperature of at least about 200° C., and applying a compression force of at least about 10 tons to the powder for a period sufficient to form a single piece of the rubber material.

In accordance with a particularly preferred embodiment of this invention, pulverization of the rubber material is conducted in a solid state shear extrusion process and apparatus as disclosed in a prior U.S. patent, U.S. Pat. No. 5,397,065 wherein the rubber material is introduced into the feed end of an extrusion apparatus, heated to a softening temperature less than the decomposition temperature of the rubber material, and cooled to a temperature below the softening temperature, after which normal and shear forces are applied to the rubber material, resulting in formation of the powder.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Critical to the process of this invention is the requirement that the rubber powders to be reconstituted are produced in a manner that maintains the integrity of the chemical composition of the rubber so as to reproduce rubbers having mechanical properties substantially equivalent to the original rubber. That is, the process of this invention reconstitutes rubber without changing its chemical structure, meaning that the chemical bonds that were broken during the pulverization stage are linked again during the reconstitution stage.

Figure 1:
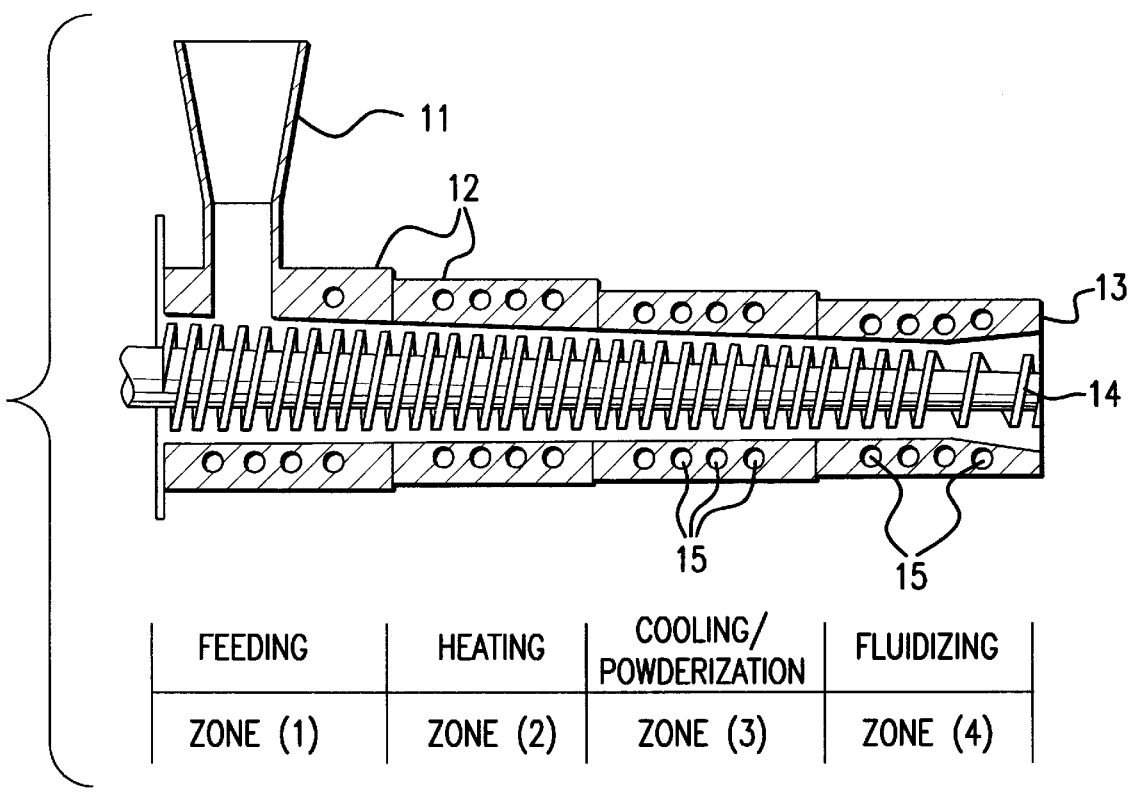
FIG. 1 is a longitudinal sectional view of a conical, counter-rotating screw apparatus suitable for pulverization of the rubber material to be recycled in accordance with one embodiment of this invention.
Figure 2:
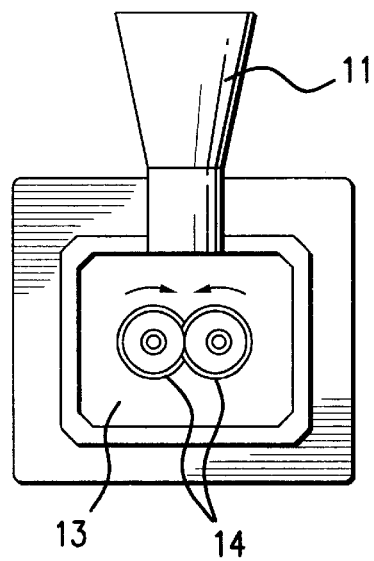
FIG. 2 is an end view of the apparatus shown in FIG. 1.
Figure 3:
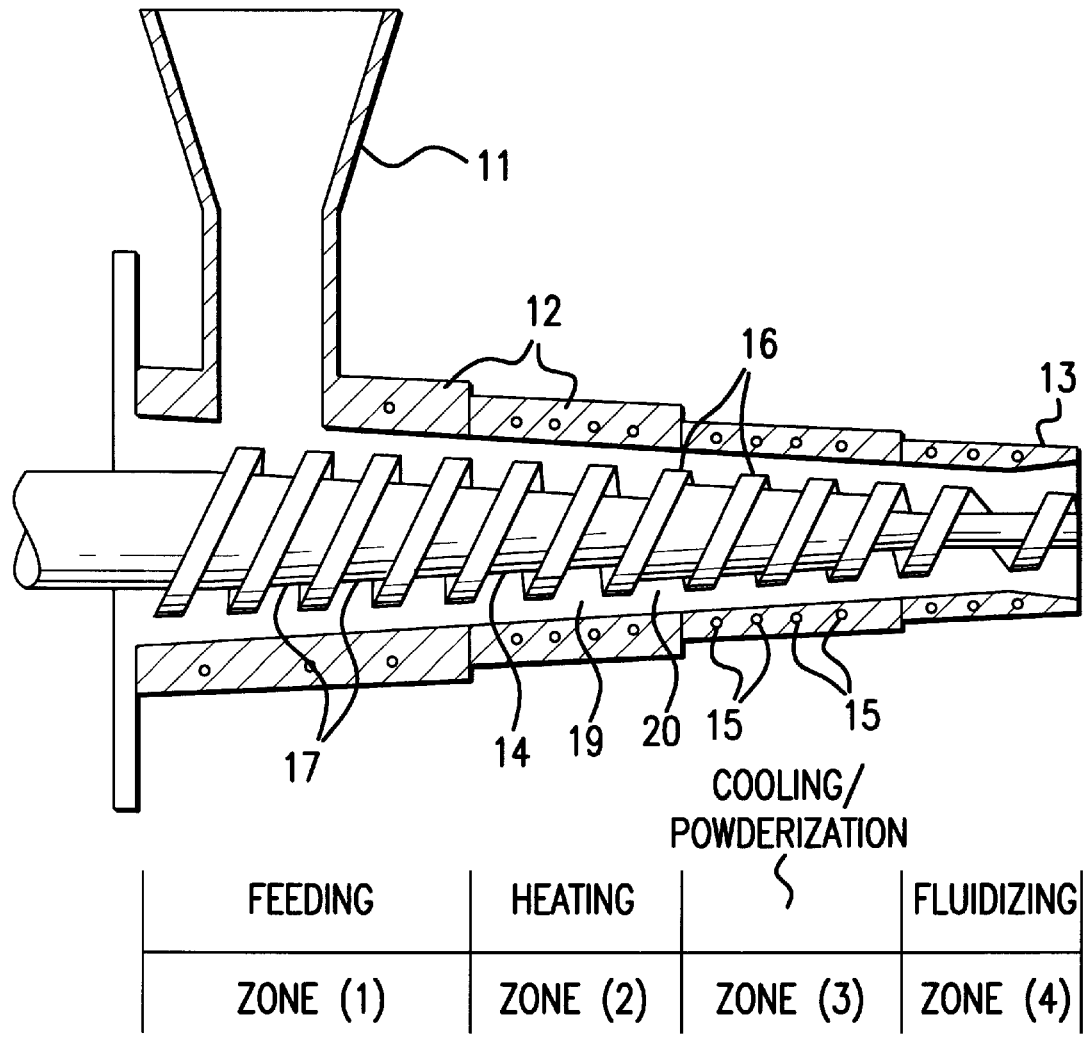
FIG. 3 is a longitudinal sectional view of a conical, single screw apparatus suitable for use in pulverization of the rubber material in accordance with one embodiment of this invention.

An apparatus suitable for use in pulverization of the rubber material to be processed in accordance with the process of this invention is shown in a longitudinal sectional view in FIG. 1. The apparatus comprises feed hopper 11 for feeding polymeric materials such as rubber, elastomers, and thermosets to feeding zone 1 within barrel 13 housing screws 14. Heaters 12 are provided in barrel walls in the region of heating zone 2. Cooling conduits 15 are provided in barrel walls in the region of cooling/powderization zone 3 and may be provided in the region of fluidizing zone 4. An increase in the diameter of the barrel opening in fluidizing zone 4 is shown. Also, an increase in spacing of the flights of screw 14, in fluidizing zone 4 is shown. FIG. 2 shows the counter rotation of screws 14 within barrel 13 in accordance with one embodiment of this invention. FIG. 3 is a longitudinal sectional view of a suitable apparatus housing a single screw 14. With the exception of having a single screw, the components comprising this apparatus correspond to the components of the apparatus shown in FIG. 1.

Figure 4:
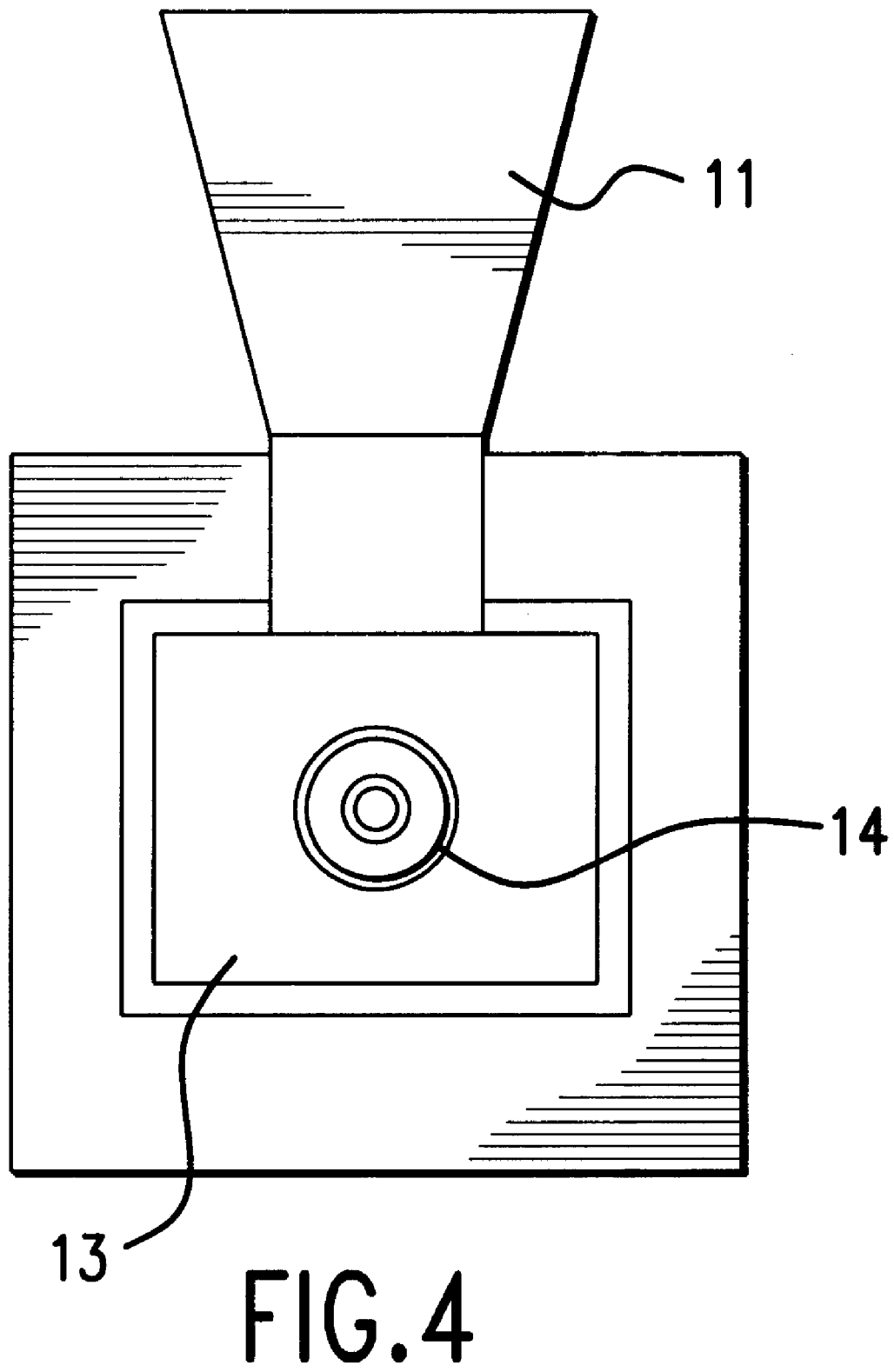
FIG. 4 is an end view of the apparatus shown in FIG. 3.

In accordance with the embodiment shown in FIG. 3, screw 14 comprises a plurality of flights (external threads) 16 and mesh (internal threads) 17. In general, screw 14 may comprise equal or unequal size flights 16 and mesh 17. The screw section in feeding zone 1 and heating zone 2 require flight and mesh sizes suitable for conveyance of the polymeric material in the feeding zone 1 into the cooling/powderization zone 3. That is, this first section of screw 14 must be capable of feeding the unit and conveying a continuous thin film through the clearance between flights 16 of screw 14 and the inside surface of hollow elongated barrel 13, while conveying thicker films between the clearance between the mesh 17 and the internal surface of hollow elongated barrel 13. Although shown in FIGS. 3 and 4 as having a smooth surface, it will be apparent to those skilled in the art that the internal surface of hollow elongated barrel 13 may be rough, resulting in the introduction of significant frictional forces at the internal surface.

In the cooling/powderization zone 3, the screw design is such that the clearance 20 between internal thread 17 of screw 14 and the interior surface of hollow elongated barrel 13 is much smaller than the corresponding clearance 19 in feeding zone 1 and heating zone 2. The decrease in the clearance between internal thread 17 of the screw 14 and the interior surface of hollow elongated barrel 13 may be rather sharp which occurs in the lower portion of the heating zone and beginning of the cooling zone, or it may be smooth throughout all three zones (feeding, heating, and cooling/pulverization). This clearance must be sufficiently small to cause the significant frictional force needed for pulverization under high shear forces. A significantly low clearance between the internal thread and the interior surface of the barrel results in the conveyance of thinner polymeric materials through the cooling/powderization zone. This (modified clearance height) results in significantly higher normal force exerted on the thin film of polymers and thus very high friction force which (strongly) resists the separation of layers of materials under high shear forces. This (high frictional force) in turn results in a continuous increase in the stored energy and, at the same time, the number of non-separated microfractures also increases significantly until the frictional force is no longer able to hold the material containing a significant number of microfractures in a continuous state and catastrophic pulverization occurs.

Heating means are provided for heating the rubber material in heating zone 2 to a softening temperature which is below its decomposition temperature. Any suitable heating means known to the art may be used; for example, hollow elongated barrel 13 may be electrically heated or a fluid heating jacket surrounding hollow elongated barrel 13 may be used in heating zone 2. In heating zone 2, where heating takes place, screw 14 serves primarily to convey the material through heating zone 2 with an appropriate residence time to achieve the desired heating prior to entry to an adjacent cooling/powderization zone 3.

Cooling means capable of cooling the softened, rubber, elastomer or thermoset polymers in cooling/powderization zone 3 to a temperature such that the polymers behave as in a solid state are located in a suitable manner to achieve the desired temperature and a suitable cooling means known to those skilled in the art may be used, for example, a fluid cooling jacket surrounding the barrel, liquid nitrogen, dry ice, or the like. In the upstream portion of the length of cooling/powderization zone 3 where cooling of the material from the higher temperature occurs, screw 14 serves primarily to convey and pulverize material within this region at an appropriate residence time to achieve the desired cooling. Cooling and cooling/powderization zone 3 forms thin solid film material and imparts very high normal and shear stresses in the thin film material. High shear force initiates formation of microfractures and high normal force results in higher friction which prevents the separation of the layers of polymeric material and, in turn, storage of significant amounts of energy and, at the same time, a growing number of microfractures, until storage of energy reaches critical values and frictional forces are no longer able to hold the material with significant microfractures in a continuous state and catastrophic pulverization occurs. Concurrently with formation of these high normal and shear stresses in the material in cooling/powderization zone 3, it is preferred that the meshing screw be shaped to provide additional normal and shear stresses to the material sufficient to form fine powder.

EXAMPLE I

The primary apparatus used in connection with a reduction to practice of this invention was a laboratory scale single screw extruder station manufactured by C. W. Brabender. The screw of the extruder was driven by a Plasti-Corder Model DR-2051, which consists of a geared motor capable of delivering 5.0 hp and a torque rheometer for measuring the torque required to drive the screw. Control of the process and data acquisition were accomplished with an Intelligent Interface Model BL-2000. The extruder itself was a vented single screw extruder having three controlled temperature zones. Heating was accomplished with electric heaters, and cooling was accomplished with both compressed air and cooling water. The screw was made of hard-chrome plated 4140 alloy, and was 0.75 inches in diameter with a length to diameter ratio of 25:1 and a compression ratio of 5:1. The maximum torque rating for the screw was 100 N-m. The extruder was fed with a horizontal metering hopper which uses a variable speed screw to control the amount of material being conveyed into the barrel.

As previously indicated, a twin screw extruder can be used for pulverization of the materials to be reconstituted in accordance with the process of this invention. A single screw extruder was selected in this case because it was felt that its action was more appropriate for natural rubber. A smaller clearance between the screw and the barrel wall, as compared to a twin screw extruder, makes the single screw design more suitable for producing the continuous high compression needed for the pulverization of rubber. Normal loading was also increased by using a compression screw (5:1 compression ratio). The compression and shear applied in the single screw extruder were nearly continuous in contrast to the twin screw extruder, where deformation is mostly performed in the gap between the screws.

At the outset, the temperature profile of the extruder barrel was set with the first two temperatures at a constant 135° C. and the third zone set at 40° C. Compressed air was used for cooling in the first two zones while cooling water had to be used in order to maintain the temperature of the third zone. Once the temperatures of the three extruder zones had reached the set points, the rotation of the screw was started. Rubber material in the form of granules 5–7 millimeters in diameter was then fed to the extruder after the screw had reached its set speed. The extrusion process was allowed to reach steady operation after which the rubber powder was collected from the end of the barrel. The temperature of the first two zones, namely 135° C., softens the rubber material so that it can be fed more easily into the compression section of the screw while heating the material to a point at which disulfide bonds present in the rubber begin to weaken. At no time is the temperature in the extrusion process allowed to exceed the decomposition temperature of the rubber. Cooling in the third zone minimizes the risk of degrading and agglomeration formation of the rubber material as it is processed with the extruder. The rotation rate of the screw was generally set near the upper limit of the range of the apparatus, approximately 70 to 80 rpm.

Figure 5:
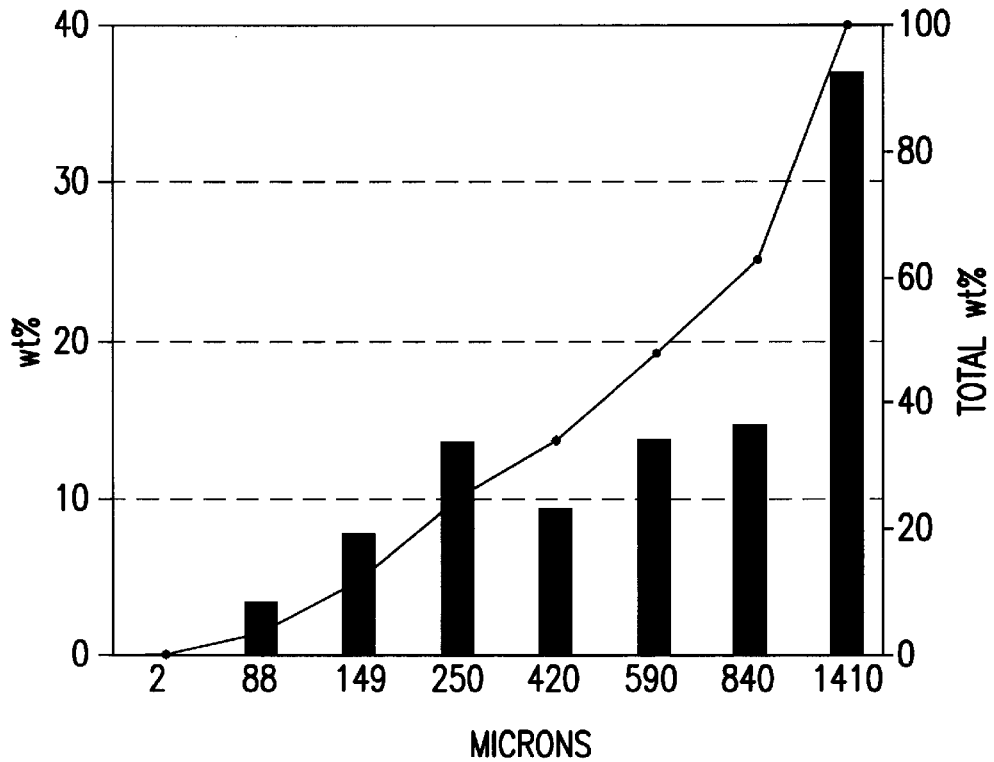
FIG. 5 is a diagram showing the particle size distribution for a rubber powder produced after a single pass through a pulverization apparatus in accordance with one embodiment of the process of this invention.

At a screw rotation rate of about 70 rpm and a feed rate of about 15.6 g per minute, after reaching steady operation, the output from the extruder was mostly fine powder mixed with larger particles. The particle size distribution for the rubber powder after a single pass through the extruder is shown in FIG. 5. The average particle size, based on weight percent, for the powder was calculated to be 817 microns with approximately 50% of the particles being less than 840 microns in diameter. The average particle size can be reduced by operating the extruder at optimum conditions. The torque required to turn to the screw was found to be in the range of about 40 to 70 N-m.

Figure 6:
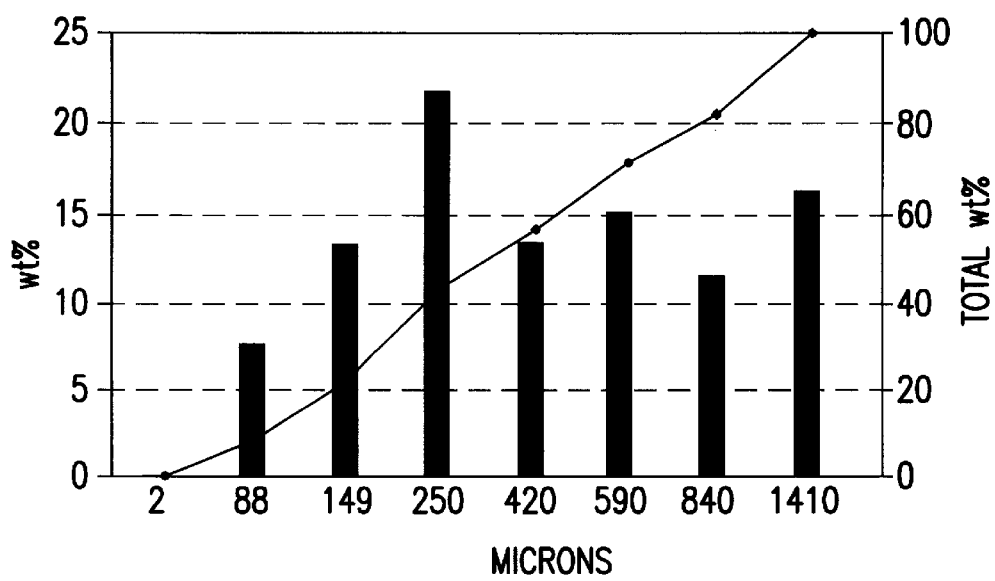
FIG. 6 is a diagram showing the particle size distribution for a rubber powder produced after two passes through a pulverization apparatus in accordance with the process of this invention.
Figure 7:
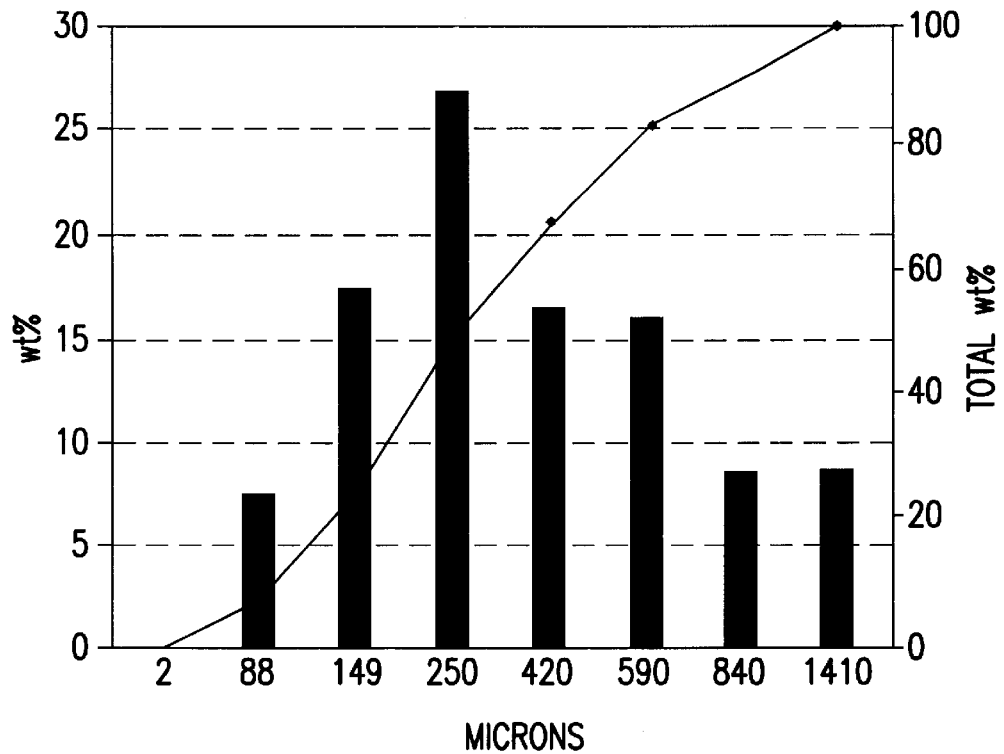
FIG. 7 is a diagram showing the particle size distribution for a rubber powder after three passes through a pulverization apparatus in accordance with the process of this invention.

Because the length of the extruder barrel was fixed, the residence time for the rubber material could not be increased if the rotation rate of the screw was held at a fixed rate. In order to take advantage of the effects of increased residence time, the rubber powder produced from one pass through the extruder was passed through the extruder a second time under the same operating conditions. The powder produced after the second pass was observed to be much finer, with a significant reduction in the number of larger particles. The particle size distribution for this twopass powder is shown in FIG. 6. The average particle diameter for the two-pass output was calculated to be 560 microns with approximately 70% of the particles being below 840 microns. In addition, the feeding of rubber particles from the first pass was substantially more continuous as compared to the feeding of granules, and the torque was observed to reach a nearly constant value of 50 N-m. The rubber powder was also passed through the extruder a third time to produce the particle size distribution shown in FIG. 7. In this case, the average particle size was calculated to be 447 microns with about 83% of the particles having a size smaller than 840 microns. Feeding was fairly continuous and the torque value remained essentially constant at about 40 N-m.

Although multiple passes of the material to be treated through the extruder help to reduce the overall particle size of the resulting powder, the process may be carried out utilizing a single pass in which the fine powder is separated from the extruder output and the large particles are recycled through the extruder by means of a recycle stream.

EXAMPLE II

Figure 8:
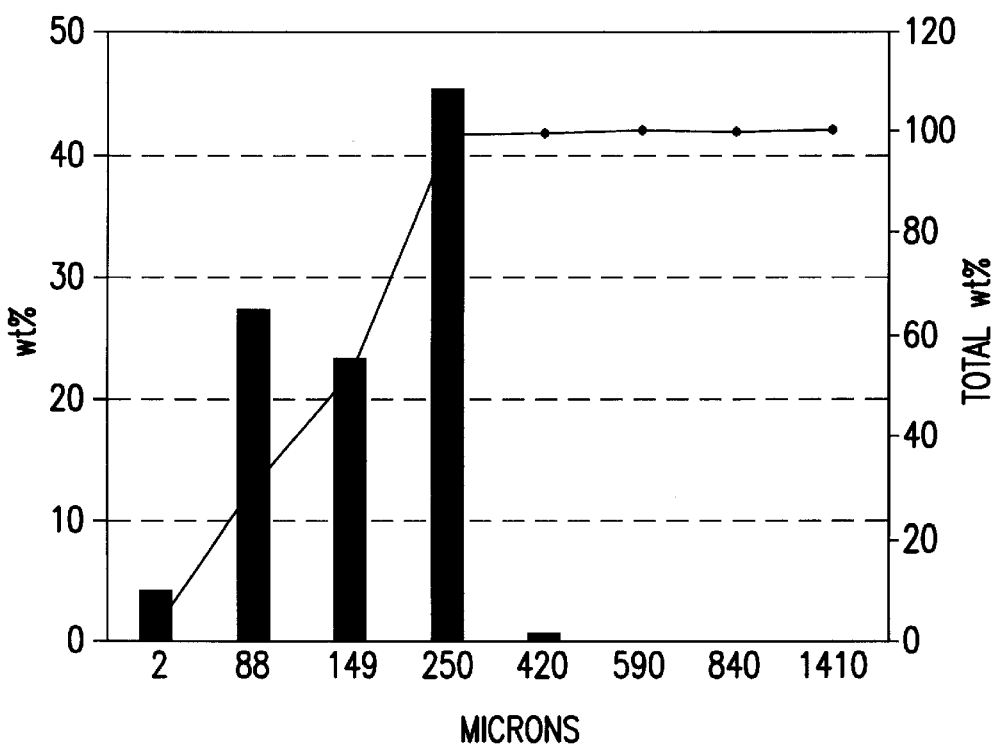
FIG. 8 is a diagram showing the particle size distribution of the fine powder fraction of the rubber powder after three passes through the pulverization apparatus.
Figure 9:
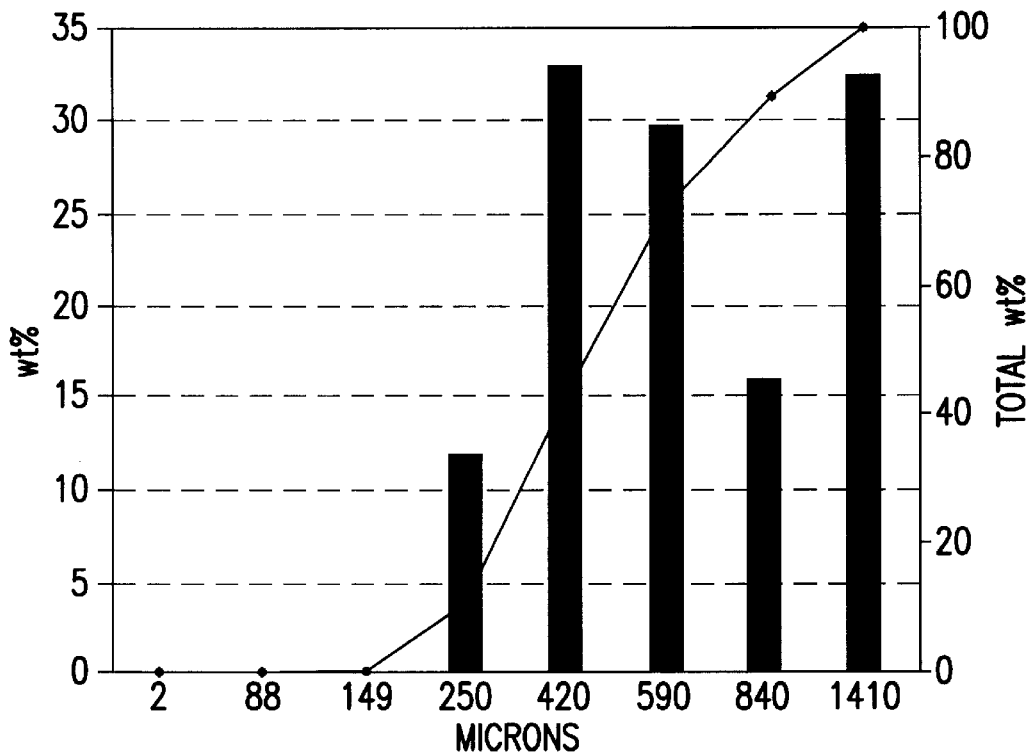
FIG. 9 is a diagram showing the particle size distribution of the large powder fraction of the rubber powders produced after three passes through the pulverization apparatus.

The output from a first pass through the extruder was separated into two fractions with a number 40 sieve (420 microns). The powder passing through the sieve was collected as the final output and the remaining portion was passed through the extruder for a second time. The output from the second extrusion was again separated with the sieve and the large fraction was passed through the extruder again. After the third pass, both the large and small fractions of the powder were collected and weighed. Nearly 75% of the total output passed through the 420 micron sieve. The particle size distribution for the fine powder fraction and the large fraction are shown in FIGS. 8 and 9, respectively. The average particle size for the small fraction was calculated to be 175 microns. The average particle size calculated for the large fraction was 630 microns. The overall average particle size was, thus, 290 microns. Thus, it is apparent that the particle size of the rubber powder can be decreased by simply separating out the small particles before passing the sample through the extruder again.

Figure 10:
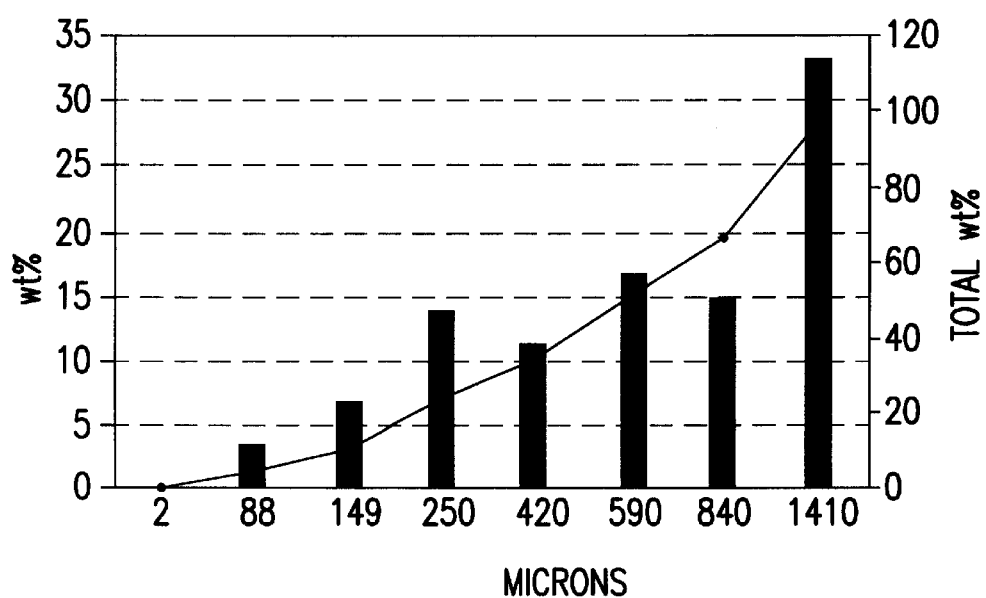
FIG. 10 is a diagram showing the particle size distribution for rubber powder produced by a pulverization apparatus in accordance with one embodiment of the process of this invention.

To determine the effect of screw rotation rate on the amount of fine powder produced in the extruder, the rotation rate of the screw was increased to 80 rpm. The feed rate was adjusted to a value of 26.4 g/minutes so that the torque would remain in the range of 40 to 60 N-m. Once steady state was achieved in the extruder, the output was determined to be nearly identical to powder obtained when the screw was rotated at 70 rpm. FIG. 10 shows the particle size distribution for the rubber powder produced at the higher screw rotation rate. The average particle size was calculated as 790 microns with approximately 52% of the particles having a size less than 840 microns. The amount of fine powder produced in the extruder was therefore increased with the screw rotation rate set at 80 rpm.

Figure 11:
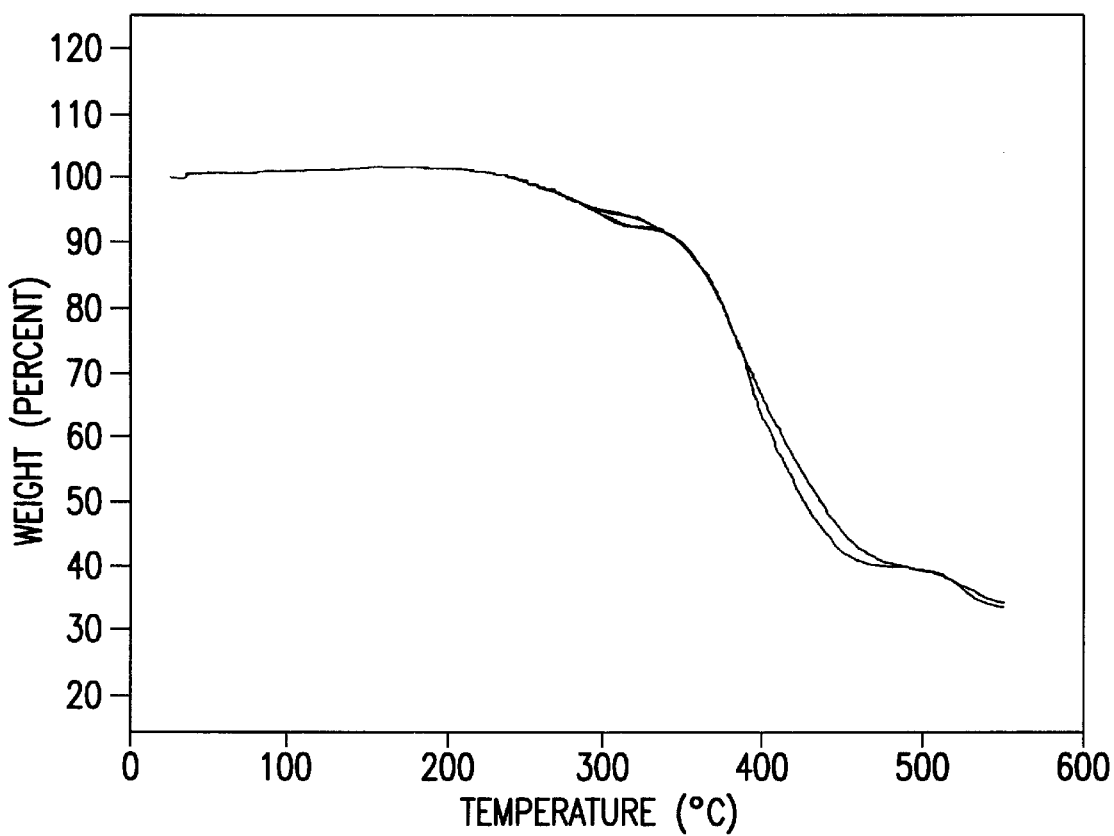
FIG. 11 is a diagram showing the characteristic thermal gravimetric analysis (TGA) curves for an undeformed rubber sample and pulverized rubber.
Figure 12:
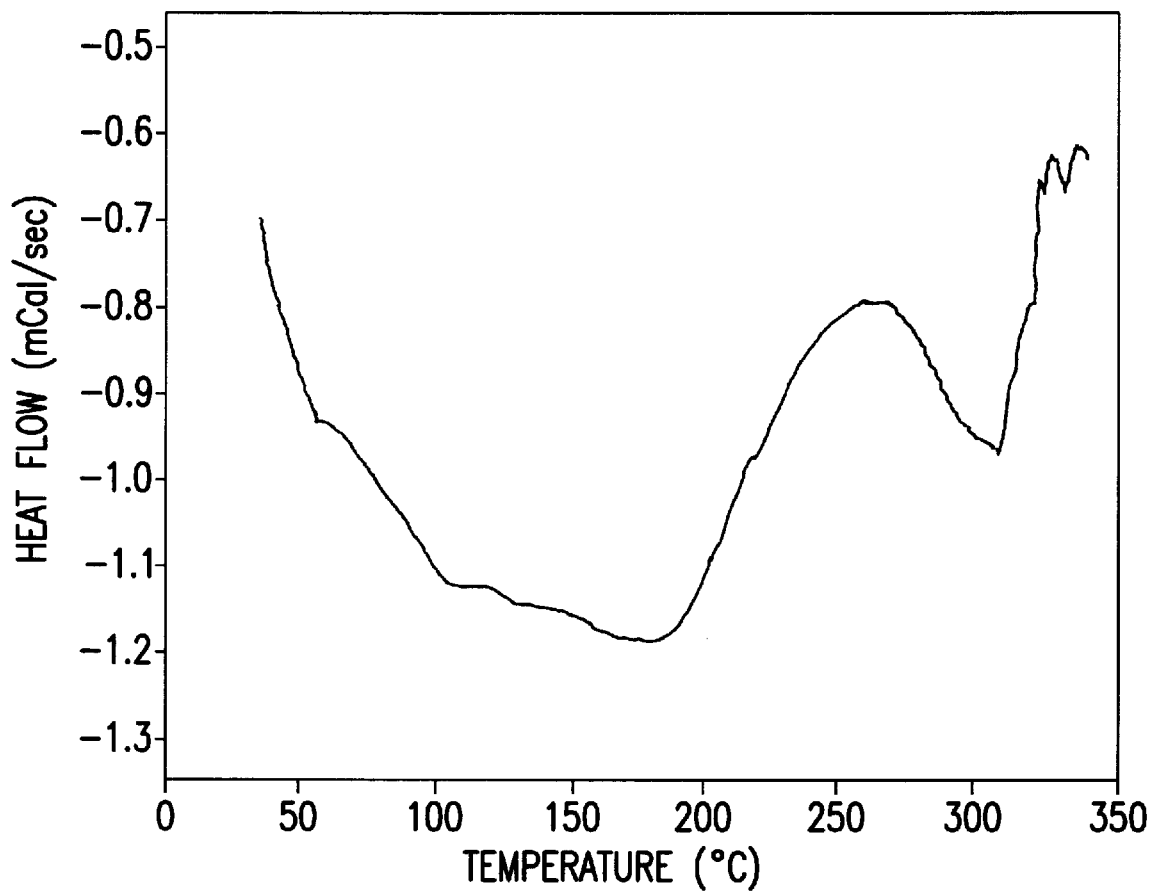
FIG. 12 is a diagram showing the characteristic differential scanning colorimetry (DSC) curve for undeformed rubber.
Figure 13:
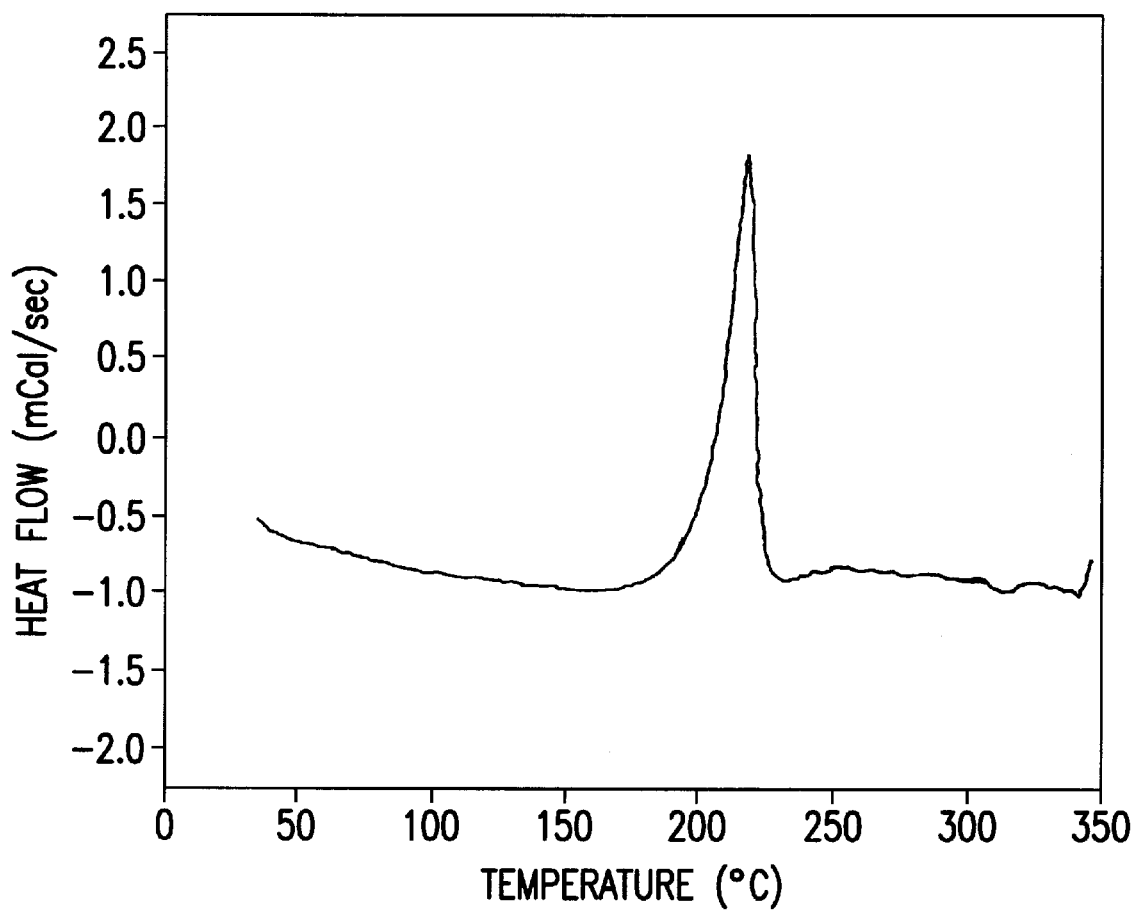
FIG. 13 is a diagram showing the characteristic DSC curve for rubber pulverized in accordance with the process of this invention.

In order to verify that the powder produced in the extrusion process had not been chemically altered in the pulverization process, the powder from the first pass through the extruder was subjected to thermal analysis. FIG. 11 shows the characteristic TGA curves for the undeformed rubber sample and the pulverized rubber. As can be seen, the composition of the two samples is nearly identical. The characteristic differential scanning colorimetry (DSC) curve for the undeformed rubber sample is given in FIG. 12. There, a single peak is observed at a temperature of about 270° C. FIG. 13 gives the characteristic DSC curve for the pulverized rubber. The data show that the pulverized rubber no longer has a peak at 270° C. Instead, a much sharper peak is found at a temperature of about 210° C. Thus, it is apparent that certain properties of the rubber sample changed as a result of the pulverization process. This change in thermal properties is believed to be a reflection of the breaking of vulcanization bonds within the rubber during pulverization.

Figure 14:
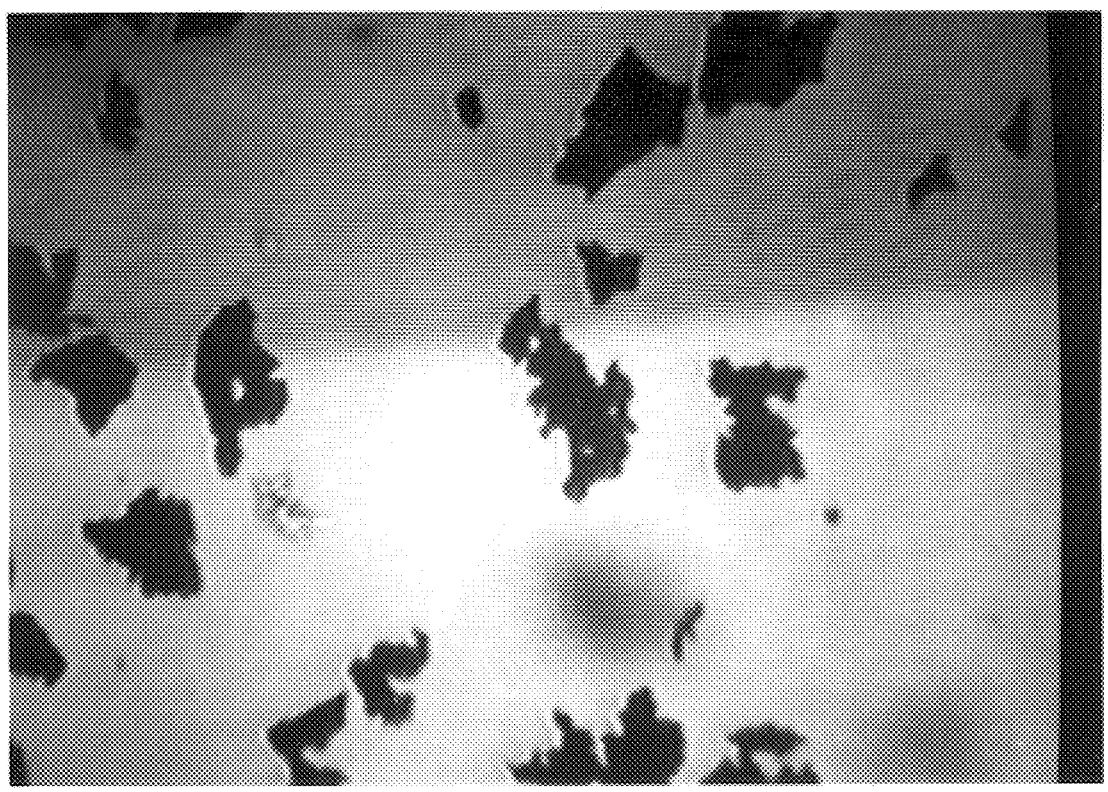
FIG. 14 is a photograph of the rubber particles produced in accordance with the process of this invention at a magnification of approximately 160×.

FIG. 14 is a photograph showing the particles produced by the pulverization process under a magnification of approximately 160×. As can be seen from the photographs, the rubber powder comprises particles having very irregular shapes. That is, the powder produced in the extruder cannot be described with a single dimension.

As previously indicated, thermal analysis of the rubber powder produced during the pulverization process shows that a change takes place in the material during the pulverization process. We believe that this change is due to the breaking of some of the disulfide bonds in the crosslinked material. We have found that introduction of the rubber powder produced in the pulverization process into a mold, heating the mold to a temperature of at least about 200° C., and applying a compressive force of at least about 10 tons for a period of at least about one hour reconstitutes the rubber powder into a single piece of rubber. The remolded rubber sample produced under these conditions has a tensile strength similar to that of the original rubber material. Small percentages (about 1–10%) of additives such as natural rubber or sulfur may be added to possibly enhance the properties of the remolded rubber.

Figure 15:
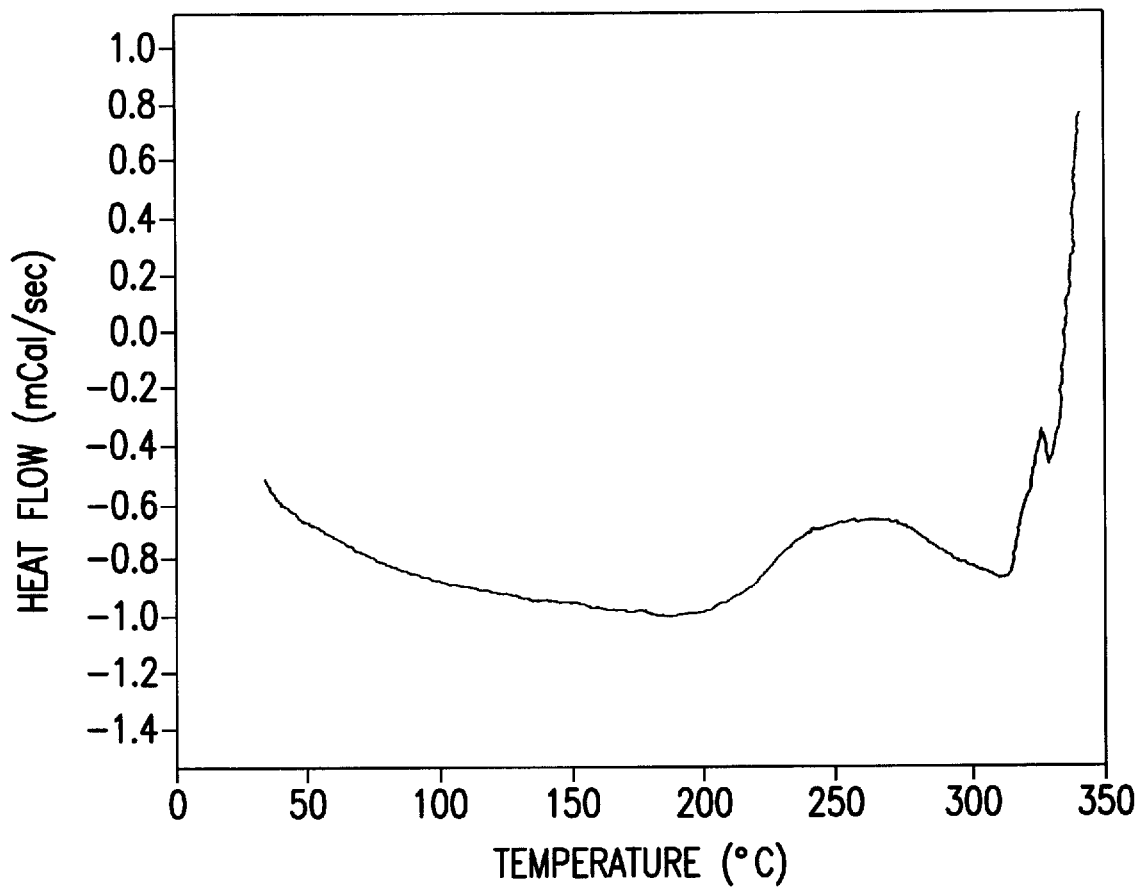
FIG. 15 is a diagram showing the characteristic DSC curve for a remolded rubber material produced in accordance with the process of this invention.

Thermal analysis performed on the remolded rubber sample shows that the thermal properties of the original material are restored in the remolded material. FIG. 15 shows the characteristic DSC curve for the remolded rubber which, when compared to the curve for the original rubber material (FIG. 12), shows a single peak at a temperature of about 270° C. However, the sharp peak observed at a temperature of about 210° C. in the DSC curve for pulverized rubber is no longer present.

In addition to the thermal analysis, we conducted a swelling test on both the original and remolded rubber samples. In a swelling test, the rubber sample is placed in a beaker filled with tetrahydrofuran (THF) overnight. The rubber sample absorbs THF and swells according to its crosslinked density. Table 1 summarizes the results obtained for the THF swelling test.

TABLE 1

Results of the THF Swelling Test

| Sample | Original Mass (g) | Swelled Mass (g) | % Increase |
| --- | --- | --- | --- |
| Original | 1.160 | 3.282 | 283% |
| Remolded | 1.109 | 3.256 | 294% |

As can be seen, the two rubber samples have substantially identical swelling properties.

Figure 16A:
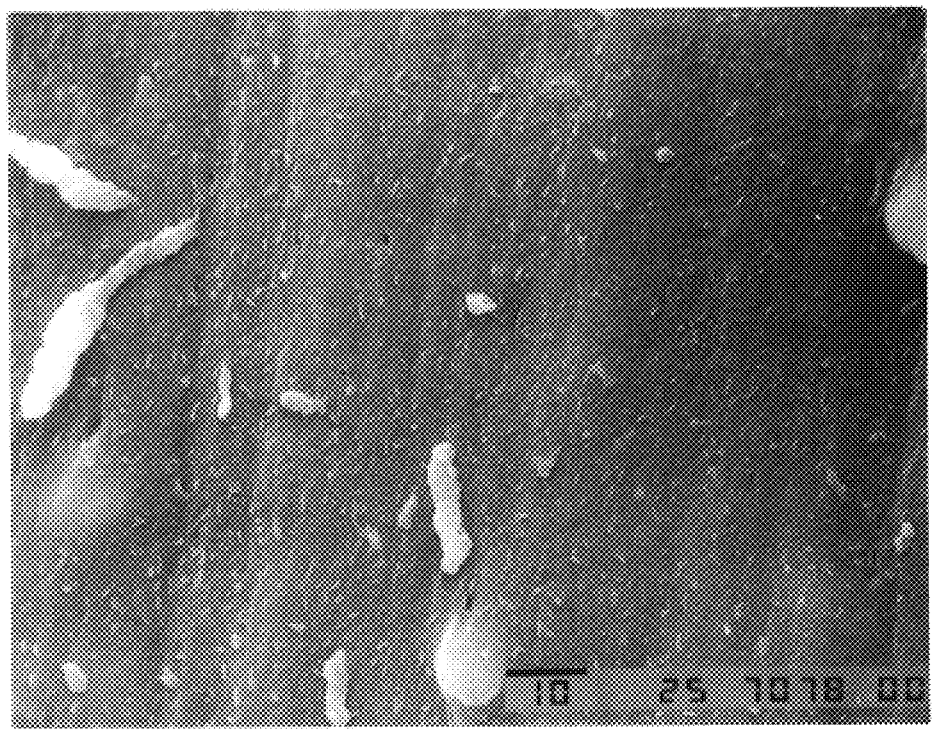
FIG. 16A is a photograph of the surface of the original rubber sample magnified 1000×.
Figure 16B:
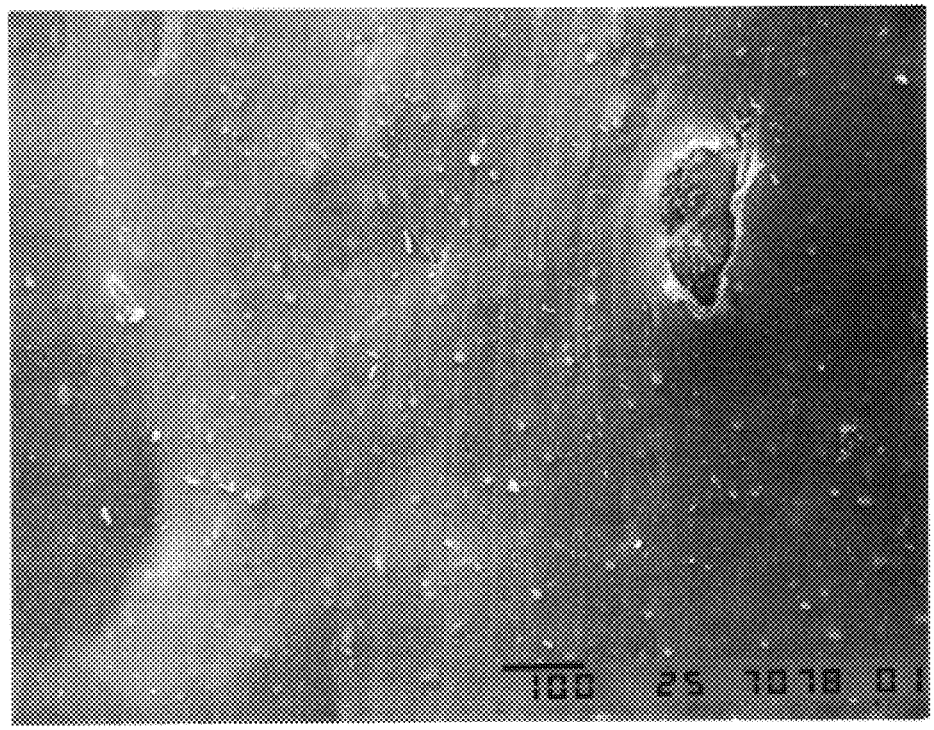
FIG. 16B is a photograph of the surface of the original rubber sample magnified 100×.
Figure 17A:
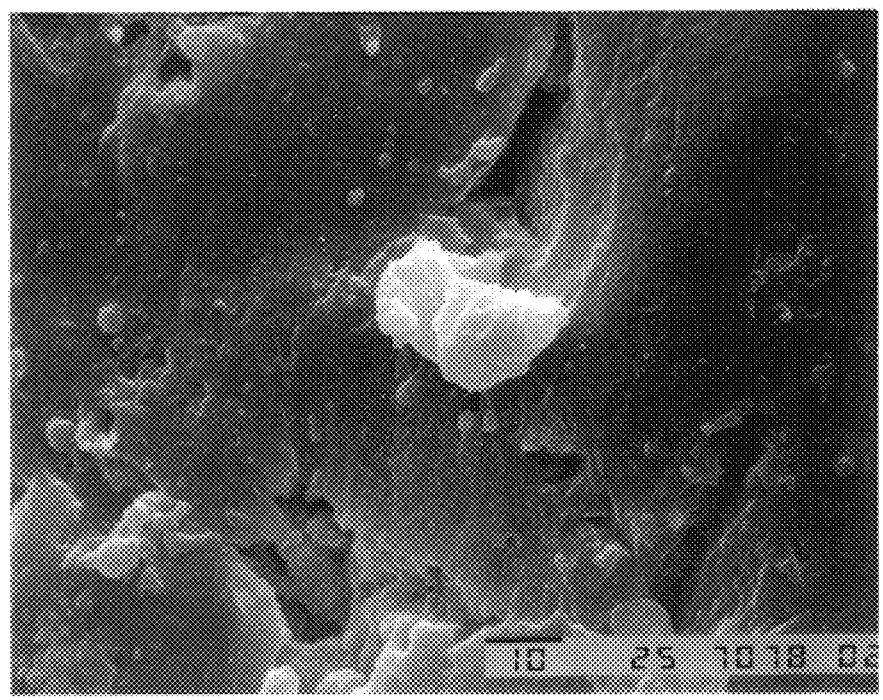
FIGS. 17A and 17B are SEM photographs at 1000× and 100× magnification of the rubber sample remolded from the powder collected below a 40 mesh sieve.
Figure 17B:
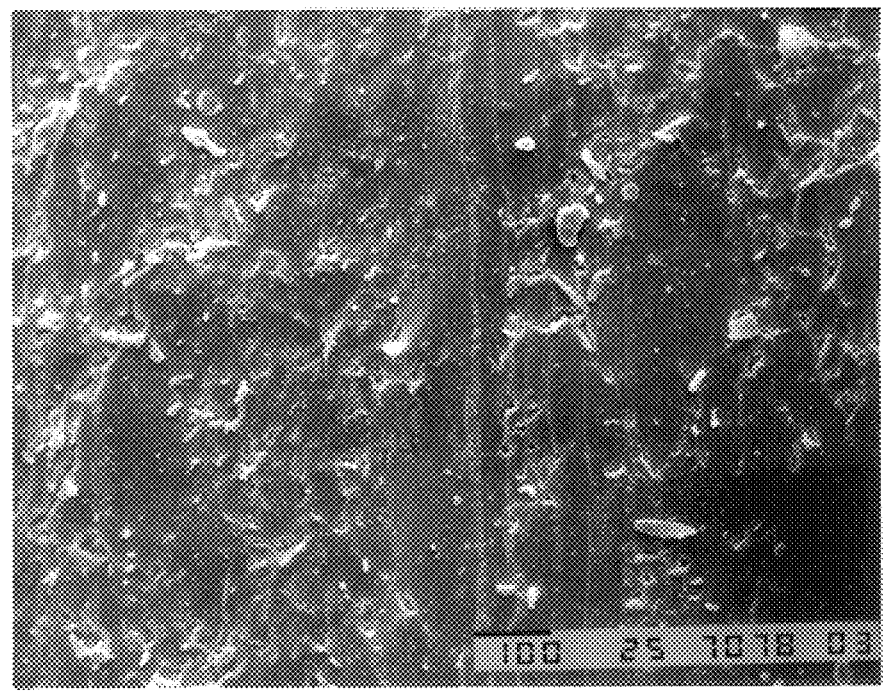
Figure 18A:
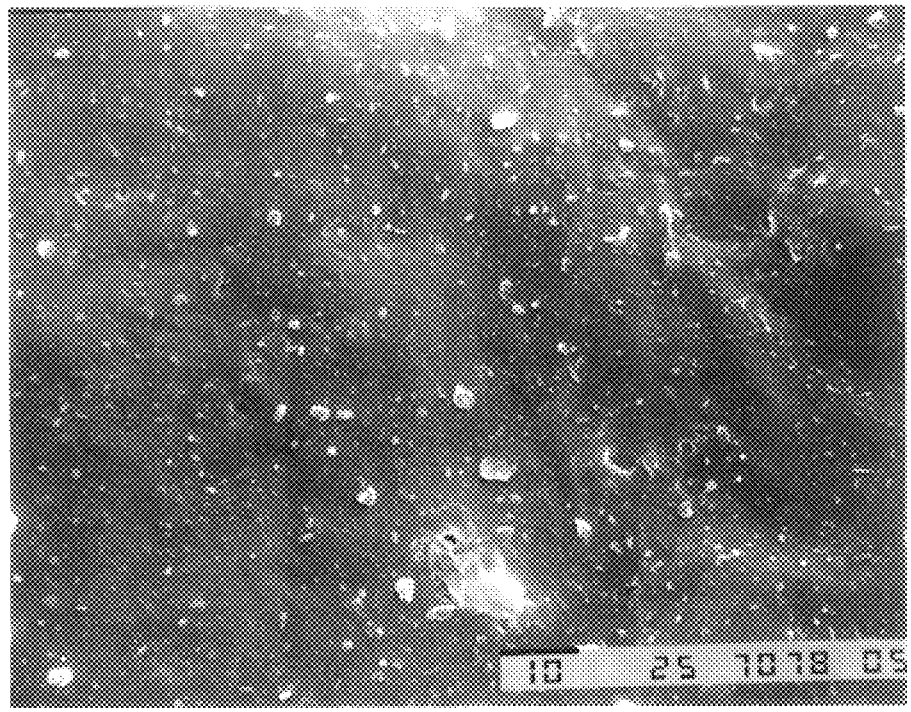
FIGS. 18A and 18B are SEM photographs for a rubber sample remolded from the powder produced by three passes of the rubber material through the pulverization process.
Figure 18B:
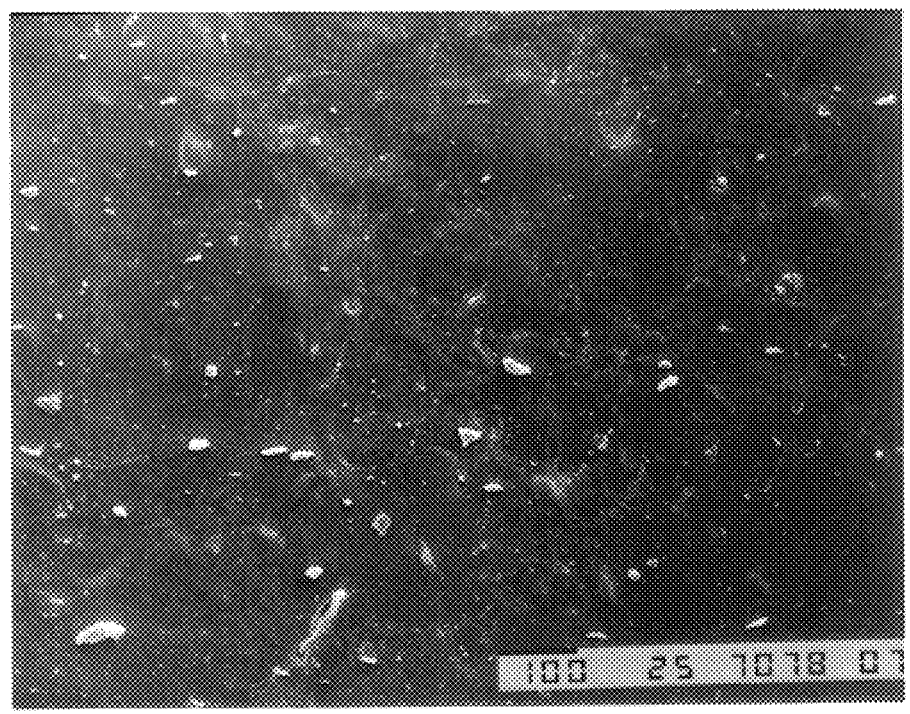

A scanning electron microscope (SEM) was used to assure that the rubber particles had, in fact, been reattached to one another. FIGS. 16A and 16B show the surface of the original rubber sample magnified 1000× and 100×, respectively, with the SEM. These pictures reveal that some particles, the irregular white objects, are visible in the surface of the original rubber material. These particles are most likely the talc or carbon black in the rubber composite. SEM photographs at 1000× and 100× magnification of the remolded rubber sample using powder having a particle size less than about 420 microns are shown in FIGS. 17A and 17B, respectively. As can be seen from these photographs, there are some voids in the remolded material where the particles were not densely packed inside the mold. This is most likely caused by the narrow size distribution of the particles in the powder. In the areas where good contact was achieved between the particles, however, the material does appear to be bonded together. FIGS. 18A and 18B show corresponding SEM photographs for a rubber sample remolded from a wide distribution of powder produced by three passes of the rubber through the extrusion process (3SSSE). These photographs show that there are no voids visible in the surface of the material. Thus, it would appear that the particles are packed together well enough in the mold to produced a remolded sample that appears to be identical to the original material.

In order to further evaluate the characteristics of the rubber reconstituted in accordance with this invention compared to the original rubber material, we conducted several experiments based upon ASTM D 638M in the preparation of specimens, preconditioning of the specimens and the application of loads. They were conducted at a constant temperature of 25° C., under a constant load over only a short period of time so that these experiments could only give information about the short term tensile properties of the specimens. One of the specimens was cut from original rubber slabs and the other was prepared from the slabs produced by compression molding of the particles obtained from solid state shear extrusion.

From the elongation data at each load, the extension ratio $\lambda=\Delta L/L_0$ (amount of elongation divided by gage length) was calculated corresponding to each engineering stress defined by $\sigma_0=F/A_0$ (force applied divided by initial cross-sectional area). Engineering stress and extension ratio data for original rubber and reconstitute rubber are shown in Table 2. Though the reconstitute rubber specimen was deformed more than the original one at the same stress level, the difference was not very significant. As a result, it can be concluded that the tensile properties of the original rubber were reconstituted upon remolding of the rubber powder at high pressure and temperature.

TABLE 2

Tensile Test Results for Reconstitute Rubber and Original Rubber

| $\sigma_0$(MPa) | $\lambda$(Original Rubber) | $\lambda$(Reconstitute Rubber) |
|---|---|---|
| 0.0 | 1.00 | 1.00 |
| 0.5 | 1.35 | 1.45 |
| 1.0 | 2.00 | 2.20 |
| 1.5 | 2.32 | 2.60 |
| 2.0 | 2.70 | 2.90 |
| 2.5 | 2.90 | 3.20 |

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for recycling rubber comprising the steps of:
   pulverizing a rubber material in a manner which maintains a chemical composition of said rubber material, producing a powder;
   introducing said powder into a mold;
   heating said mold to a temperature of at least about 200° C.; and
   applying a compression force of at least about 10 tons to said powder for a period of at least about one hour, forming a single piece of said rubber material.

2. A process in accordance with claim 1, wherein said powder comprises particles having a weight average size less than about 600 microns.

3. A process in accordance with claim 1, wherein said rubber material is introduced into an apparatus suitable for pulverizing said rubber material, heated to a softening temperature less than a decomposition temperature and cooled to a temperature below said softening temperature, and normal and shear forces are applied to said rubber material, forming said powder.

4. A process in accordance with claim 3, wherein said applying of said normal and shear forces is conducted by counter-rotating meshing screws rotated at about 4 to about 90 RPM.

5. A process in accordance with claim 3, wherein said applying of said normal and shear forces is conducted by a single rotating screw disposed within a barrel housing.

6. A process for reconstitution of rubber comprising the steps of:
   introducing a rubber powder produced by a solid state shear extrusion pulverization process into a mold;
   heating said mold to a temperature of at least about 200° C.; and
   applying a compression force of at least about 10 tons to said rubber powder for a period of at least about one hour, forming a single piece of rubber.

7. A process in accordance with claim 6, wherein said powder is comprised of particles having a particle size less than about 1500 microns.

8. A process in accordance with claim 7, wherein said particles have a weight average particle size of less than about 600 microns.

* * * * *